United States Patent
Kumar (10) Patent No.: US 7,657,937 B1
(45) Date of Patent: Feb. 2, 2010

(54) METHOD FOR CUSTOMIZING PROCESSING AND RESPONSE FOR INTRUSION PREVENTION

(75) Inventor: Dileep Kumar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 669 days.

(21) Appl. No.: 10/751,234

(22) Filed: Jan. 2, 2004

Related U.S. Application Data (60) Provisional application No. 60/437,677, filed on Jan. 2, 2003.

(51) Int. Cl.
 *H04L 29/14* (2006.01)
(52) U.S. Cl. ...................................................... 726/23
(58) Field of Classification Search ........................ None
 See application file for complete search history.

(56) References Cited

U.S. PATENT DOCUMENTS

| | | | |
|---|---|---|---|
| 5,278,901 A | 1/1994 | Shieh et al. | |
| 5,414,833 A | 5/1995 | Hershey et al. | |
| 5,557,742 A | 9/1996 | Smaha et al. | |
| 5,623,600 A | 4/1997 | Ji et al. | |
| 5,720,033 A | 2/1998 | Deo | |
| 5,727,146 A | 3/1998 | Savoldi et al. | |
| 5,826,013 A | 10/1998 | Nachenberg | |
| 5,948,104 A | 9/1999 | Gluck et al. | |
| 5,983,348 A | 11/1999 | Ji | |
| 5,991,881 A | 11/1999 | Conklin et al. | |
| 6,035,423 A | 3/2000 | Hodges et al. | |
| 6,272,641 B1 | 8/2001 | Ji | |
| 6,279,113 B1 | 8/2001 | Vaidya | |
| 6,321,338 B1 | 11/2001 | Porras et al. | |
| 6,477,651 B1 | 11/2002 | Teal | |
| 7,007,299 B2 * | 2/2006 | Ioele et al. | 726/14 |
| 7,240,368 B1 * | 7/2007 | Roesch et al. | 726/23 |
| 2002/0042875 A1 * | 4/2002 | Shukla | 713/151 |
| 2004/0049596 A1 * | 3/2004 | Schuehler et al. | 709/238 |

OTHER PUBLICATIONS

Anderson, James P. "Computer Security Threat Monitoring and Surveillance", Apr. 15, 1980.
Newmann, Peter http://www.csl.sri.com/users/neumann/neumann.html.
Denning et al., "Prototype IDES: A Real-Time Intrusion-Detection Expert System," SRI Project ECU 7508; SRI International, MenloPark.
Ilgun et al., State Transition Analysis: A Rule-Based Intrusion Detection Approach, IEEE Transactions on Software Engineering, vol. 21, No. 3, Mar. 1995.
Liepins et al., "Anomaly Detection: Purpose and Framework," US DOE Office of Safeguards and Security.
Shieh et al., A Pattern-Oriented Intrusion-Detection Model and Its Applications .Copyrgt. 1991 IEEE.
Common Vulnerabilities and Exposures (CVE), http://www.cve.mitre.org.

(Continued)

*Primary Examiner*—Minh Dinh
(74) *Attorney, Agent, or Firm*—Rajeev Madnawat (57) ABSTRACT

A method for customizing the response for network based intrusion prevention comprising of: 1) virtual proxying the application data to enable custom response 2) enhancing transport layer (TCP/IP) to enable selective processing and selective modification of the stream for intrusion prevention. The invention also discloses a method for customizing the processing for both network or host based intrusion prevention comprising of: 1) loading externally defined processing procedures for the detection and prevention of intrusions 2) combining multiple of these processing procedures to form a unified processing engine that can be used for intrusion detection and prevention 3) unloading processing procedures that are not needed any more 4) loading new processing procedures that improve the intrusion detection and prevention.

3 Claims, 5 Drawing Sheets

Main elements used by the method for customizing processing and response for intrusion prevention.

OTHER PUBLICATIONS

Vulnerability Statistics, http://icat.nist.gov/icat.cfm?function=statistics.

Debar, et al., "Towards a Taxonomy of Intrusion-Detection Systems," Computers Networks 31 (1999), 805-822.

Lunt, "A Survey of Intrusion Detection Techniques," Computers & Security, 12 (1993) 405-418.

Koral Ilgun et al. "State Transition Analysis: A Rule-Based Instrusion Detection Approach", IEEE Trans. Software Eng. vol. 21, No. 3, Mar. 1995, pp. 181-199.

Teresa F. Lunt "A survey of intrusion detection techniques" Computers & Security, 12 (1993) pp. 404-418 (Elsevier Science Publishers Ltd.).

Teresa F. Lunt et al. "A Real-Time Instrusion-Detection Expert System (IDES)", Final Technical Report, Feb. 28, 1992 (SRI International) pp. 1-156.

Herve Debar et al. "Towards a Taxonomy of Intrusion-Detection Systems" (Elsevier Preprint), Oct. 28, 1998 pp. 1-31.

Shiuh-Pyng Shieh et al. "On a Pattern-Oriented Model for Intrusion Detection" IEEE Trans. Knowledge and Data Eng. vol. 9, No. 4 (1997) pp. 661-667.

Helen J. Wang et al. "Shield: Vulnerability-Driven Network Filters for Preventing Known Vulnerability Exploits" SIGCOMM '04, Aug./Sep. 2004.

"Computer Security Threat Monitoring and Surveillance" James P. Anderson Co., Feb. 26, 1980, pp. 1-54.

Kenneth J. MacLeod "Patch Management and the Need for Metrics" SANS Institute (c) 2004 pp. 1-20.

* cited by examiner

Fig.1 Main elements used by the method for customizing processing and response for intrusion prevention.

Fig.2 The interaction of a virtual proxy with the transport layer, and main elements of the transport layer Fig.3: The transport layer optimized for the protection of server applications Fig.4 Merging processing procedures to form a unified processing engine

Fig.5 Main elements of processing procedures

METHOD FOR CUSTOMIZING PROCESSING AND RESPONSE FOR INTRUSION PREVENTION

CROSS REFERENCE TO RELATED APPLICATIONS

This application is based on provisional application Ser. No. 60/437,677, filed on Jan. 2, 2003.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The present invention relates generally to intrusion prevention and more specifically it relates to a method for customizing processing and response for intrusion prevention.

History of Intrusion Detection

In 1980, James P. Anderson published a study outlining ways to improve computer security auditing and surveillance at customer sites. The original idea behind automated Intrusion Detection (ID) is often credited to him.

Between 1984 and 1986, Dorothy Denning and Peter Neumann researched and developed the first model of real time Intrusion Detection System (IDS). The prototype was named Intrusion Detection Expert System (IDES).

The report published by James P Anderson and the work on IDES was the start of research on IDS throughout 1980s and 1990s.

DESCRIPTION OF THE RELATED ART

It can be appreciated that intrusion prevention and policy enforcement devices for computer systems in an organization have been in use for years.

There are two methods used in customizing the response for intrusion prevention. In the first method, a packet stream is analyzed using a number of intrusion detection methods such as signature analysis, anomaly detection, protocol analysis, etc. When an intrusion is detected, the apparatus takes externally configured or built-in action for that type of violations. Usually the actions could be to generate an alarm or log, or take a blocking action such as dropping packets or session that carry the packets containing the intrusion activity.

U.S. Pat. No. 6,279,113 to Vaidya describes a dynamic signature-inspection based network intrusion detection method. This method uses the signature profile of network objects to detect security violations. These profiles can be added to intrusion detection systems to enhance the detection capabilities. U.S. Pat. No. 6,477,651 to Teal describes a system and method for detecting unauthorized or malicious use of network resources that instantiates one or more analysis objects to detect signatures associated with attacks on network vulnerabilities. As new network vulnerabilities are identified, new analysis objects are injected in the intrusion detection system on a runtime basis to improve its intrusion detection capabilities.

The problem with this method is that is not possible to make the response smarter. For example, it is not possible to remove malicious content, nullifying attack, or cleaning the vulnerability violations from the packet stream. Another thing to be noted is that to stop an attack, it is not always acceptable to either drop packets or sessions. For example, most anti-virus systems will remove or nullify a virus in a file. They don't delete the files. For automatic prevention to work, the prevention-response need to be more sophisticated and customized.

In the second method for customizing the response, the application session is terminated. The application data is removed from the session and analyzed for intrusion activity. Customized response base on externally defined application policies are applied on the application data. The modified application is sent back to the destination by restarting a new session. If application runs on Transport Control Protocol (TCP), the TCP session carrying application data is terminated. The application data is removed from the session and analyzed for intrusion activities. A custom response based an external configuration will be applied on the data. This method is also referred in the related arts as application proxy. For example, U.S. Pat. No. 5,623,600 to Ji, et al describes a method to detect and remove viruses for computer networks that uses FTP proxy server for FTP data and SMTP proxy server for SMTP data.

There are two problems with application proxy based method to customize the response. First, the performance of proxy-based method is poor. Second, it is difficult to build full a fault tolerant and fully redundant implementation of an application proxy.

The methods used for customizing the processing for the detection of intrusions fall into one general category that is policy or an external interface based processing engines. These methods have built-in processing engine that could be an application proxy or an intrusion detection engine using a number of methods such as signature analysis for intrusion detection. The behavior of this processing engine is customized using an external interface, which is many times referred to as policy or profile interface. An externally defined configuration, policies, or profiles are used to customize the behavior of processing engines. The problem with this approach is that the type of external policies, profiles, or external configuration that can be defined is statically built in the processing engine. The processing engine permits redefinition of a set of parameters. It is not possible to extend the set of parameters without changing the processing engine using a software upgrade. The external interface, policies, or profiles lack expressiveness of Turing Machine. For this reason, it is not possible to capture many new application weaknesses, vulnerabilities, or new classes of intrusion attacks without requiring a total software or hardware upgrades. It is also not possible to remove unnecessary processing to improve the performance.

In these respects, this invention for customizing processing and response for intrusion prevention substantially departs from the conventional concepts and designs of the prior art, and in so doing provides a method primarily developed for the purpose for customized processing and response for intrusion prevention.

BRIEF SUMMARY OF INVENTION

In view of the foregoing disadvantages inherent in the known types of intrusion prevention systems now present in the prior art, this invention provides a new method for customizing processing and response for intrusion prevention.

The general purpose of the present invention, which will be described subsequently in greater detail, is to provide a new method for customizing processing and response for intrusion prevention that has many of the advantages of the intrusion prevention mentioned heretofore and many novel features that result in a new method which is not anticipated, rendered obvious, suggested, or even implied by any of the prior art intrusion prevention, either alone or in any combination thereof.

In accordance with a preferred embodiment of the invention, there is disclosed a method for customizing the response for intrusion prevention comprising of: 1) virtually proxying the application data to enable custom response 2) enhancing transport layer (TCP/IP) to enable selecting processing and selective modification of the steam for network based intrusion prevention. The invention also discloses a method for customizing the processing for intrusion prevention comprising of: 1) loading externally defined processing procedures for the detection and prevention of intrusions 2) combine multiple of these processing procedures to form a unified processing engine that can be used for intrusion detection and prevention 3) unloading processing procedures that are not needed any more 4) loading new processing procedures that improve the intrusion detection and prevention.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method for customizing response for intrusion prevention and a method or customizing the processing for intrusion prevention.

Another object is to provide a method that can be used to customize the response that permits all possible actions such as dropping the application session which contains intrusions or cleanup the vulnerability violations.

Another object is to provide a method that can be used to customize the response and still deliver higher performance than possible with proxy based methods for customizing the response.

Another object is to provide a method that can load new processing procedures that can fully capture newly discovered vulnerabilities, new application features, application exposures.

Another object is to provide a method that can efficiently load new procedures and merge them with older procedures in a manner that the combined result in terms of effectiveness to detect and stop intrusions and performance is same as if the old and new procedures were written together to optimize the effectiveness and performance.

Another object is to provide a method that will make it easier to support new applications and protocols for the purpose of intrusion detection and prevention.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Turning now descriptively to the drawings, in which similar reference characters denote similar elements throughout the several views, the attached figures illustrate a method for customizing processing and response for intrusion prevention.

A concept of virtual proxy is introduced to describe the method for customizing response for intrusion prevention. The virtual proxy differs from application proxy on a number of fronts. First, the virtual proxy works at the packet level. The data in the packets is analyzed and intrusions are detected. The virtual proxy by itself does not change the packet. If modifications to the packets are required, they are carried out by using a custom interface with the transport layer.

The method for customizing the response uses virtual proxies and enhances transport layer to carry out these functions. The application packets are intercepted using network based in-line appliance. These packets go through an enhanced TCP/IP transport and routed to appropriate virtual proxies. The virtual proxies use intrusion prevention processing engine to detect attacks and violations. A custom interface with transport layer is used to take customized response to handle attacks and violations.

1. Virtual Proxies

Virtual proxies are separated based on the processing required for intrusion detection and convenience of separating the packet stream for different virtual proxies at the transport layer. For example, one simple approach will be using different virtual proxies for different applications, where application packets can be separated out based on transport layer headers.

Each virtual proxy receives re-ordered packets from the transport layer. The ordering is important for TCP applications, as it is the responsibility of the transport layer to sequence out of order packets. Similarly, a virtual proxy for TCP applications expects packets will be re-ordered by transport layer before they are handed over to it. A virtual proxy uses intrusion prevention processing engine to detect violations. Virtual proxy does not modify packets to take any action. The transport layer is enhanced to support an interface that can be used to take various responses for intrusion prevention. The response may include all possible actions such as dropping session or removing malicious content.

Figure 1:
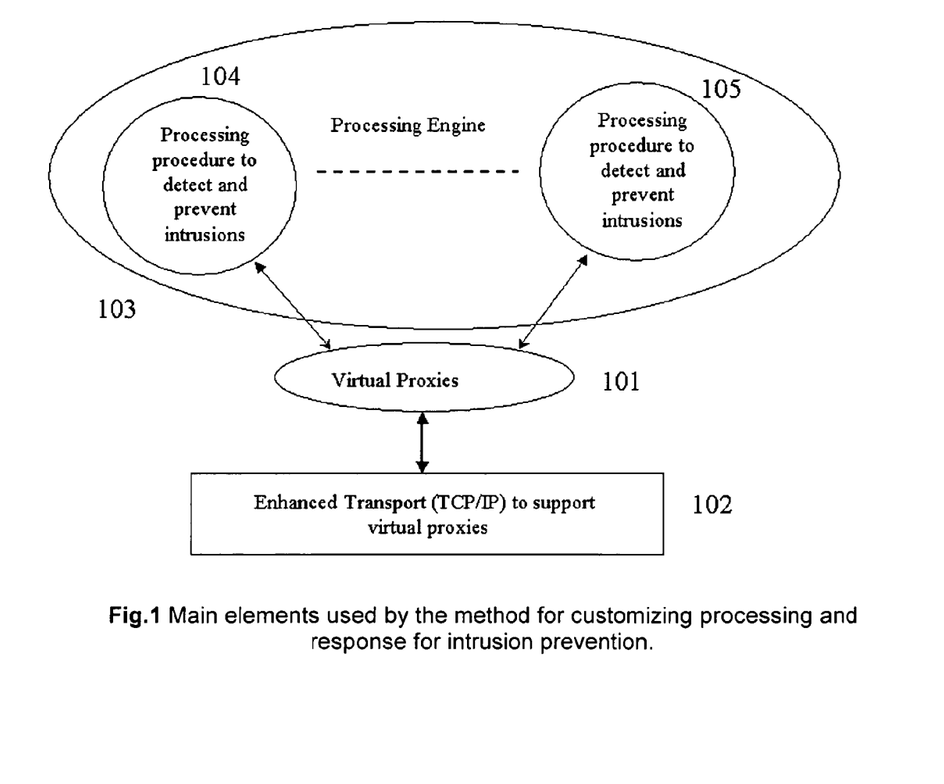
FIG. 1 shows main elements used by the method for customizing processing and response for intrusion prevention.

FIG. 1 shows the functional model of a virtual proxy 101. The transport layer (TCP/IP) 102 is enhanced to support virtual proxies. Instead of using Berkley Socket interface, virtual proxies use a custom interface with the transport layer. This interface is used to retrieve application stream from incoming data, send the data back to the destination, and to take custom response for intrusion prevention.

The transport layer passes the application packets to virtual proxies. Virtual proxies use intrusion prevention processing engine 103 to analyze the application data in the packets.

The application data packets are maintained by the transport layer. The pointer to these packets move from ingress queue to packet controller and from packet controller to egress queue. If a packet needs to be deleted, the virtual proxy requests transport layer to delete it. If a packet needs to be modified, the virtual proxy uses the custom interface with transport layer to modify it. This interface will support all functions that are needed to take a customized action when an attack or violation is detected.

1.1 Vproxy Interface with Transport Layer

Figure 2:
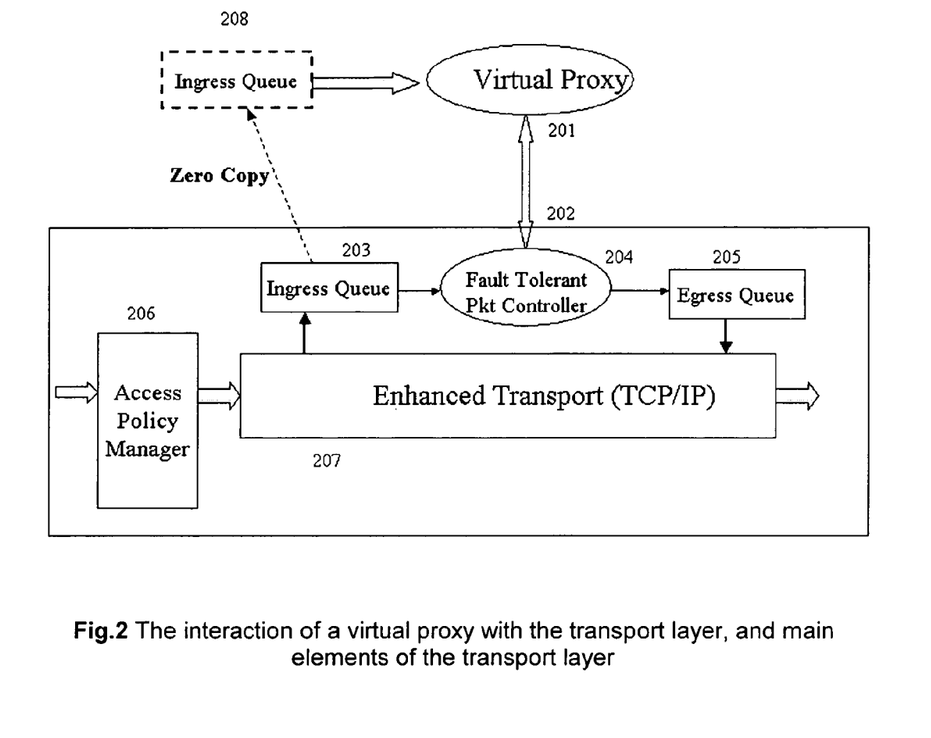
FIG. 2 shows the interaction of a virtual proxy with the transport layer, and main elements of the transport layer

An application proxy uses one of the two popular programming interfaces called Berkeley Sockets and TLI (Transport Layer Interface). These interfaces are useful if we want to terminate TCP and UDP connections. On the other hand, a virtual proxy only need to check the data flowing though a session, and if violations are detected it needs to take appropriate action. A customized interface is used for virtual proxy to interface with TCP and UDP protocol layers. FIG. 2 shows the interaction between virtual proxy 201 and transport layer 202.

There is one ingress packet queue 203, packet controller 204, and egress packet queue 205 for every virtual proxy. Each virtual proxy 201 will process packets of one or more sessions. The transport layer will store the received protocol segments in ingress queue 204. Each ingress queue 204 has packets for multiple session. Virtual proxy 201 when de-queues a packet from ingress queue 203, it is placed in the packet controller 204. The virtual proxy 201 will process the packet and will send it to egress queue 206. There will be instances where it will let the packet stay in the packet controller 204. Only after it has processed multiple packets of a session, it may decide to transfer them to egress queue 205.

Once the packets reach in the egress queue 205, the transport layer will automatically send them to the destination.

FIG. 2 also shows the internal of enhanced transport layer. The packets are intercepted by a network based appliance. The access policy manager 206 decides whether to forward the packet at layer 3 (IP layer), or routed to a virtual proxy. If the packet is routed to virtual proxy, it goes through TCP or UDP processing and put in the ingress queue. The packet controller 204 decides whether to forward this packet to egress queue or ask vproxy to use processing engine for intrusion prevention to figure violations and take custom response.

The interface between virtual proxy and transport layer will support at least the following functions:

1. A signal function that goes from the transport layer to vproxy when new sessions arrive. The transport layer will put information about newly arrived sessions into a queue, which a vproxy can pick.
2. A function that will remove the packet from the ingress queue and put it in packet controller, and return the packet pointer to the caller (vproxy).
3. A function that will send the packets from packet controller queue to egress queue.
4. A function that will remove data from a packet from the specified locations.
5. A function that will add data in the packet at the specified location.
6. A function that will modify data in the packet at the specified location.
7. A function that will delete a packet.
8. A function that add new packets after a given packet in an application session.
9. A function that will retrieve the next packet (given a packet location) from the same session.
10. A function that will retrieve the previous packet from the same session given a packet location.
11. A function that will take action to delete an application session.
12. A function that will allow vproxy to specify a packet locations and tell transport layer to forward all the full or half packets carrying data upto xyz bytes after that location to egress queue. The data after the specified location may be in packet controller queue, ingress queue, or it may not have arrived. If it has arrived in one of these queues, it is directly passed to egress queue. If the data has not arrived yet, the state and information needed to pass future data to egress queue is kept in the packet controller.
13. A function that allows vproxy to inform transport layer in real time what packets can be passed directly from ingress queue to egress queue without requiring further analysis.
14. A function that allows vproxy to configure transport layer to directly forward packets at layer 3 (IP layer).

1.2 Enhancing TCP and UDP Protocol Processing

The protocols processing needs to be enhanced to support the following new functions:

1) Add ability to transmit and receive data using the same packets and perform all the protocol functions that are needed to maintain application sessions at the transport layer.
2) Enhance session start procedure to automatically forward session start packets and at the same time maintain their state in the local state machine and data structures.
3) Add ability to add, remove, or modify data in the packets and take necessary action to make these operations seamless from source and destination perspective. For example, to perform these operations in TCP will require update sequence numbers, ack numbers, and options.
4) Selectively skip the processing which is not needed. For example, if the data from a trusted server need not be processed, there is not need to perform re-ordering or re-transmission capabilities for all packets coming from trusted server.

1.3 Impact of Vproxy Model on Performance and Fault Tolerance

This section presents analysis of vproxy model and how it provides better performance and fault tolerance capabilities than traditional approaches for customizing response.

1.3.1 Performance

Figure 3:
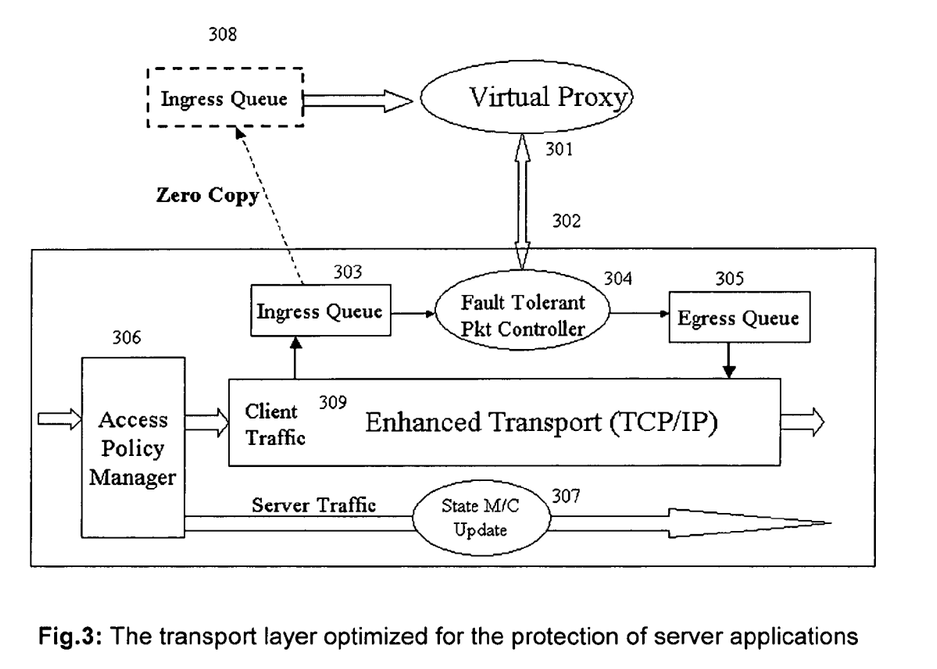
FIG. 3 shows the transport layer optimized for the protection of server applications

The following elements of the vproxy model enable a high performance solution for intrusion prevention with customized response:

1. Only those packets which are suspect for intrusion activities are forwarded to virtual proxy. The rest gets forwarded in the transport layer itself. For example, the SMTP based intrusions take advantage of vulnerabilities in headers and not the payload. Hence the packets containing payload can be automatically forwarded by transport layer. They don't need to be processed by virtual proxy. Similarly, the FTP based attacks take advantage of vulnerabilities in control channel and hence the data channel traffic can be automatically forwarded at IP layer.
2. Many operating systems, for example Solaris or Linux, use virtual memory systems that do not permit memory sharing across processes or from a kernel to a user space. The transport layer interface used by application proxies in such operating system requires copying data from kernel to user space for intrusion prevention processing and copying data from user space to kernel for sending data to the destination. The copying of data twice results in significant impact on the performance. Since, a vproxy operates at packet level, it is easy to implement a zero copy interface between vproxy and transport layer even when vproxy implementation is being done on operating systems such as Linux or Solaris.
3. If the purpose of intrusion prevention is to protect server applications, we only need to analyze the server data for intrusion activities. The data coming from server is trusted data. This vproxy model permits forwarding server responses for such applications at the transport layer itself. FIG. 3 shows, how this forwarding is accelerated. The access policy manager 306 detects if it is the application data coming from a trusted server. If yes, it forwards it to a state machine update module. This module does the minimal processing needed to update the state of the transport layer and sends the packet to the destination.
4. The most application proxies use Berkeley Socket Interface to retrieve and send data from an application session. This interface requires making system call for every data transfer for every session. Every system call also results in context switching between Kernel and User space processes. The performance of the proxy can degrade due to a high volume of system calls. The vproxy model uses queue-based model for receiving and transmitting packets and accepting new session. As the packets or new sessions arrive, they are put in the queue. No system call is needed to fetch new data, send data, or accept new sessions, resulting in improved performance for this method for customizing response.

1.3.2 Fault Tolerance

Another important advantage of vproxy model is its ability to enhance fault tolerance for an apparatus using this method. It is relatively simple to support session level redundancy between an active and standby apparatus. This is done by sending all the packet stream modification requests from active packet controller to standby controller. In the standby state, the apparatus will receive packets, but will not transmit them. The combination of packets received from both side and the packet modification requests that come from the active apparatus can be used to maintain a fully redundant copy of the transport layer states. The standby apparatus will need to maintain an egress queue that will contains all the updated packets that have not been acknowledged yet. When the primary apparatus fails, the standby apparatus can become active. First, it will have to retransmit all the packets that were in the egress queue. After that, it needs to revert back to normal operation, which includes sending packets to vproxy for intrusion prevention processing.

2.0 Method for Customizing Processing for Intrusion Prevention

This invention presents a method that allows changing the behavior of the processing for intrusion prevention. The customization permitted by this method enables changing the behavior of the processing engine. This change can only be permitted, if a method that parallels Turing Machine in expressiveness is used to capture it. This method can work with both virtual proxy or application proxy based model to detect and prevent intrusions.

Figure 4:
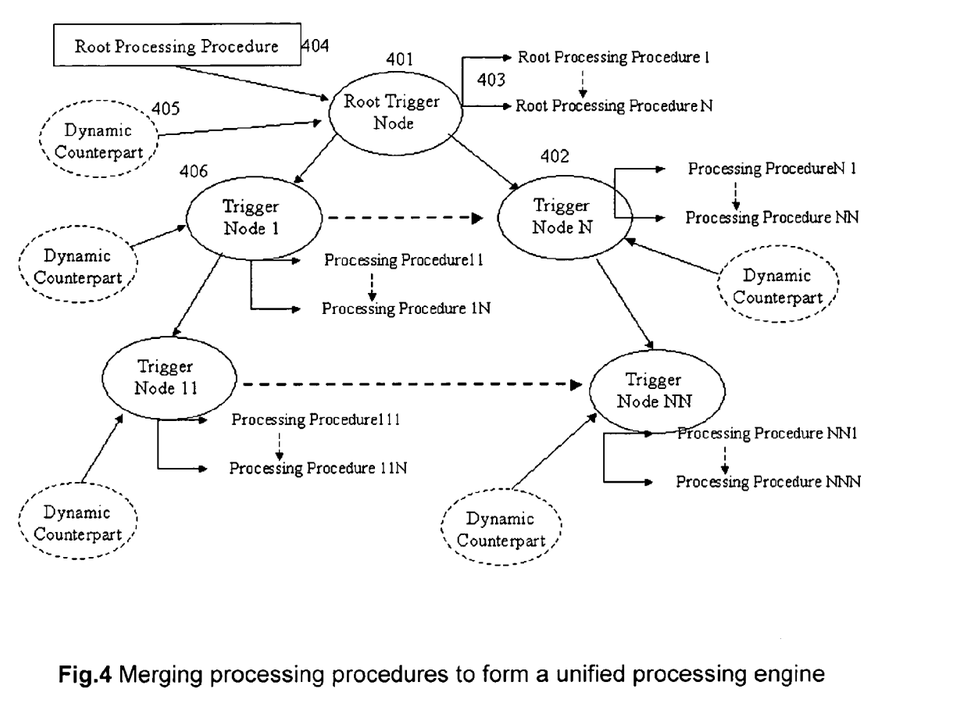
FIG. 4 shows how various processing procedures are combined using a semantic tree to form a unified processing engine

FIG. 4 shows the main elements of the processing engine. The processing engine consists of a semantic tree that contains trigger nodes and processing procedures. Each trigger node also has a dynamic counterpart, which is created separately for each application session by processing procedures. Trigger nodes and their dynamic counterpart have parent-child relationship.

Each trigger node carries the list of processing procedure that needs to be triggered, when its dynamic counterpart is created. Trigger nodes are created by processing procedures. The root trigger node is the first node in the semantic tree. Its dynamic counterpart is created by the root processing procedure. The root processing procedure is the entry point for the first data unit of an application session. As the processing progresses, the application data units move to different processing procedures.

The semantic tree is built by loading the machine-compiled libraries for processing procedures at the run time. The most operating systems have system libraries that permit loading of machine code at the run time. For example, Linux has dlopen library, which permits loading compiled machine code library.

Figure 5:
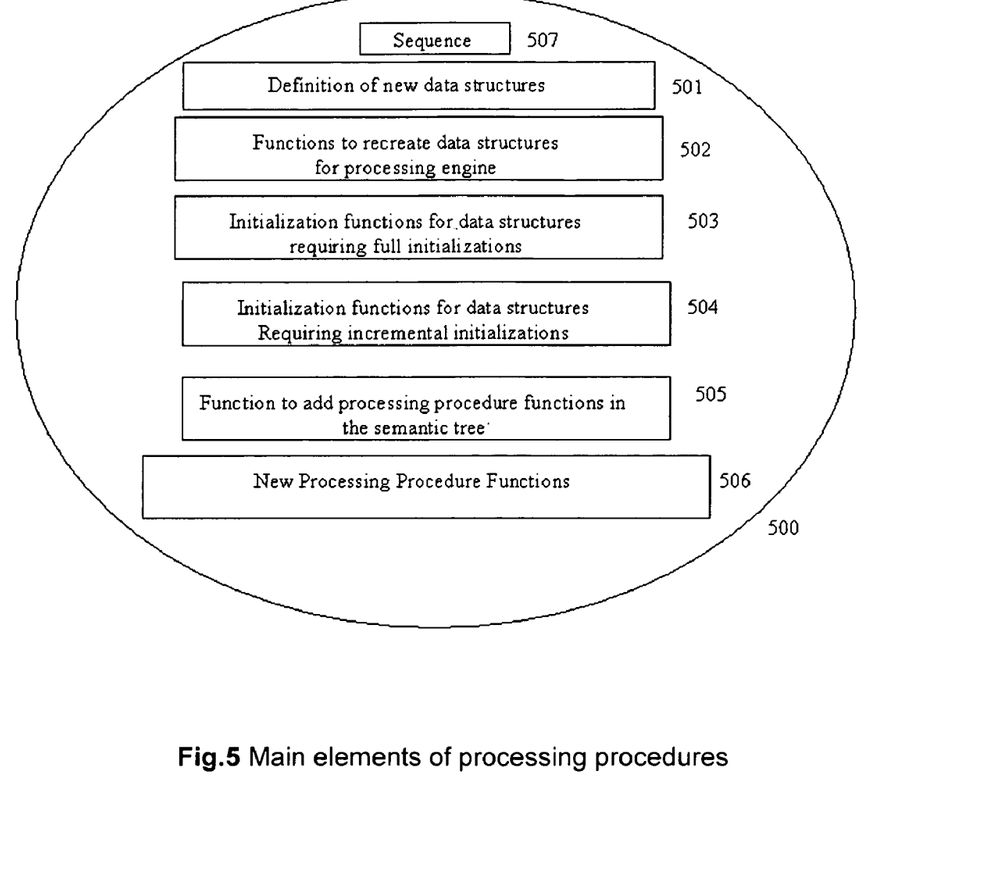
FIG. 5 shows main elements of processing procedures

FIG. 5 shows the main elements of the processing procedure library:

1. Sequence number: this number tells the order in which a processing procedure library should be loaded in relation to other libraries
2. New Data Structure Definitions
3. Functions to create data structures for the processing engine
4. Initialization functions for data structures requiring full initialization
5. Initialization functions for data structures requiring incremental initialization
6. Functions to add processing procedure functions in the semantic tree
7. New processing procedure functions When a new processing procedures need to be added, or old one removed, the semantic tree for processing engine is rebuilt. The following process is used to build a new semantic tree:

1. Create new data structure using the library with the highest sequence number
2. Use full initialization function from the library with the highest sequence number to initialize the data
3. Use incremental initialization function from all libraries starting with the lowest sequence number and going in the ascending order of sequence number to initialize the data structures 4. Use the initialization function from the highest sequence library to create all Trigger nodes in the semantic tree
5. Use semantic tree population function from all libraries starting with the lowest sequence number and going in the ascending order of sequence number to put processing procedures in the semantic tree Once a new semantic tree is built, two methods can be used to switch packet processing from old processing engine to new processing engine:

1) Let old application sessions use the old processing engine, and any newly arrived session will use the new processing engine (new semantic tree) for preventing intrusions. When there is no session left which is using the old semantic tree, remove the old semantic tree.

2) All new sessions use the new semantic tree. For old sessions, a transition point is defined which can be used to switch them from old semantic tree to new semantic tree.

When the first application data unit arrives, the root processing procedure is used to start the detection and prevention intrusions. This procedure creates a dynamic counter part of root trigger node. Separate dynamic counterpart of Trigger nodes are created for separate sessions. The creation of this node results in triggering all processing procedures that exist in the root trigger node. These procedures may further create other trigger nodes, which will result in invoking all the processing procedures for these nodes. This process continues until an application session exists. When an application session dies, the state information including dynamic counterparts of trigger nodes is removed. Each processing procedure processes application data and it may continue to move the processing pointer in the application data.

2.1 Customizing Processing for Intrusion Prevention

To make the intrusion prevention effective, the processing engine should be constantly updated so that it can recognize violations of new vulnerabilities and exposures. The method presented in the last section can be used for this purpose. The violations for new vulnerabilities and exposure can be captured using new processing procedures. These processing procedures can be uploaded at the run time to understand new vulnerabilities. The key benefit of this method is that it is not limited by the expressiveness of a policy engine or interface needed to capture information about new vulnerabilities or exposures. The processing procedure can be written externally to using a method that provides the necessary expressiveness to accurately capture the vulnerabilities and exposures. The helper functions should be added in the library for each processing procedure to enable merging it with the processing engine. The processing procedures along with the helper functions needs to be compiled into machine code or byte code, which can be loaded at the run time to improve the efficacy of the processing engine. Another advantage of this method is that the performance of processing can be improved by removing the processing procedures that are not needed any more. For example, if an application vulnerability has been patched, the processing procedure this vulnerability can be removed.

What is claimed is:

1. A method for preventing intrusions to a computer system, comprising:

using a network-based appliance to intercept data packets;
 deciding whether to forward the intercepted packets or whether to route the intercepted packets to a virtual proxy;
 performing TCP or UDP processing on the intercepted packets before routing them to the virtual proxy;
 using the virtual proxy to analyze the packets that have been routed to the virtual proxy to detect intrusions using a processing engine having at least one processing procedure that detects intrusions; and
 when the virtual proxy detects an attack or violation in the packets, using the virtual proxy to direct a transport layer to modify the packets,
 wherein the virtual proxy directs the transport layer to modify the packets using packet stream modification requests, the method further comprising sending the packet stream modification requests from the network-based appliance to a standby network-based appliance to support fault tolerance.

2. The method defined in claim 1 wherein using the virtual proxy to direct the transport layer to modify the packets further comprises:

modifying data in the packets at specified locations.

3. The method defined in claim 1 further comprising using the virtual proxy to direct the transport layer to remove data from the packets when the virtual proxy detects an attack or violation.

* * * * *

UNITED STATES PATENT AND TRADEMARK OFFICE
CERTIFICATE OF CORRECTION

PATENT NO. : 7,657,937 B1 Page 1 of 1
APPLICATION NO. : 10/751234
DATED : February 2, 2010
INVENTOR(S) : Dileep Kumar Panjwani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1339 days.

Signed and Sealed this

Thirtieth Day of November, 2010

David J. Kappos
*Director of the United States Patent and Trademark Office*